R. H. FOWLER, T. BENSTEAD & A. PEPPER.
DISK PLOW FOR STEAM CULTIVATION.
APPLICATION FILED JAN. 4, 1909.
954,950.
Patented Apr. 12, 1910.
5 SHEETS—SHEET 5.
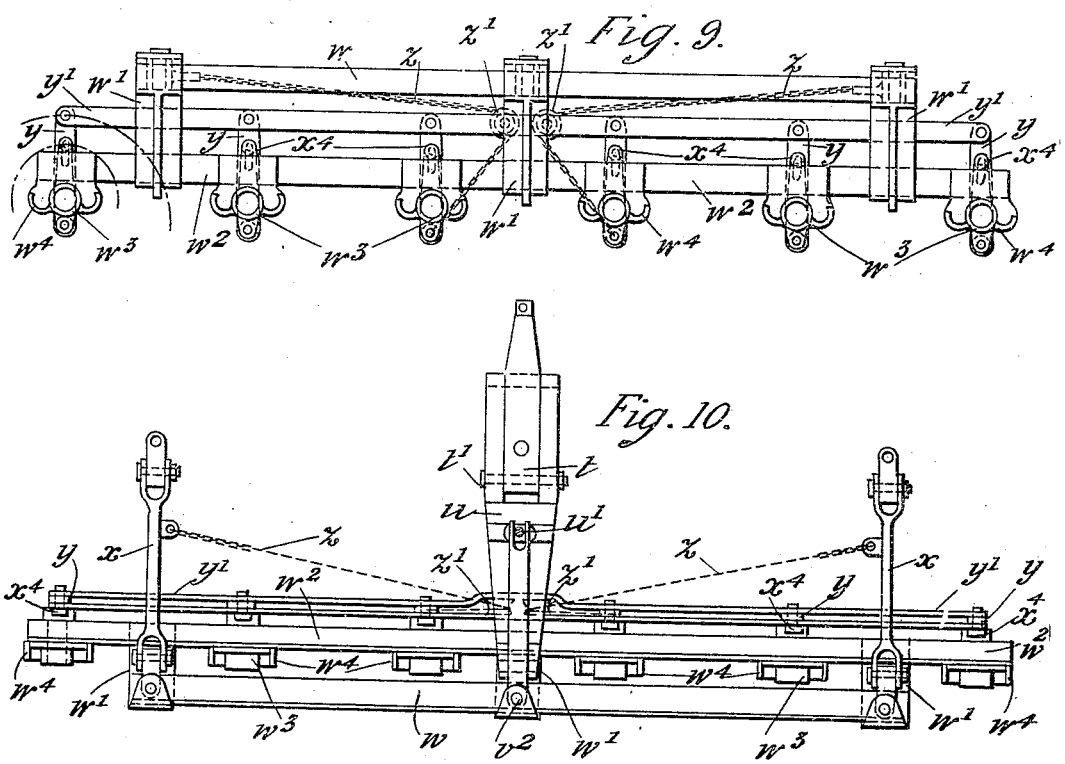

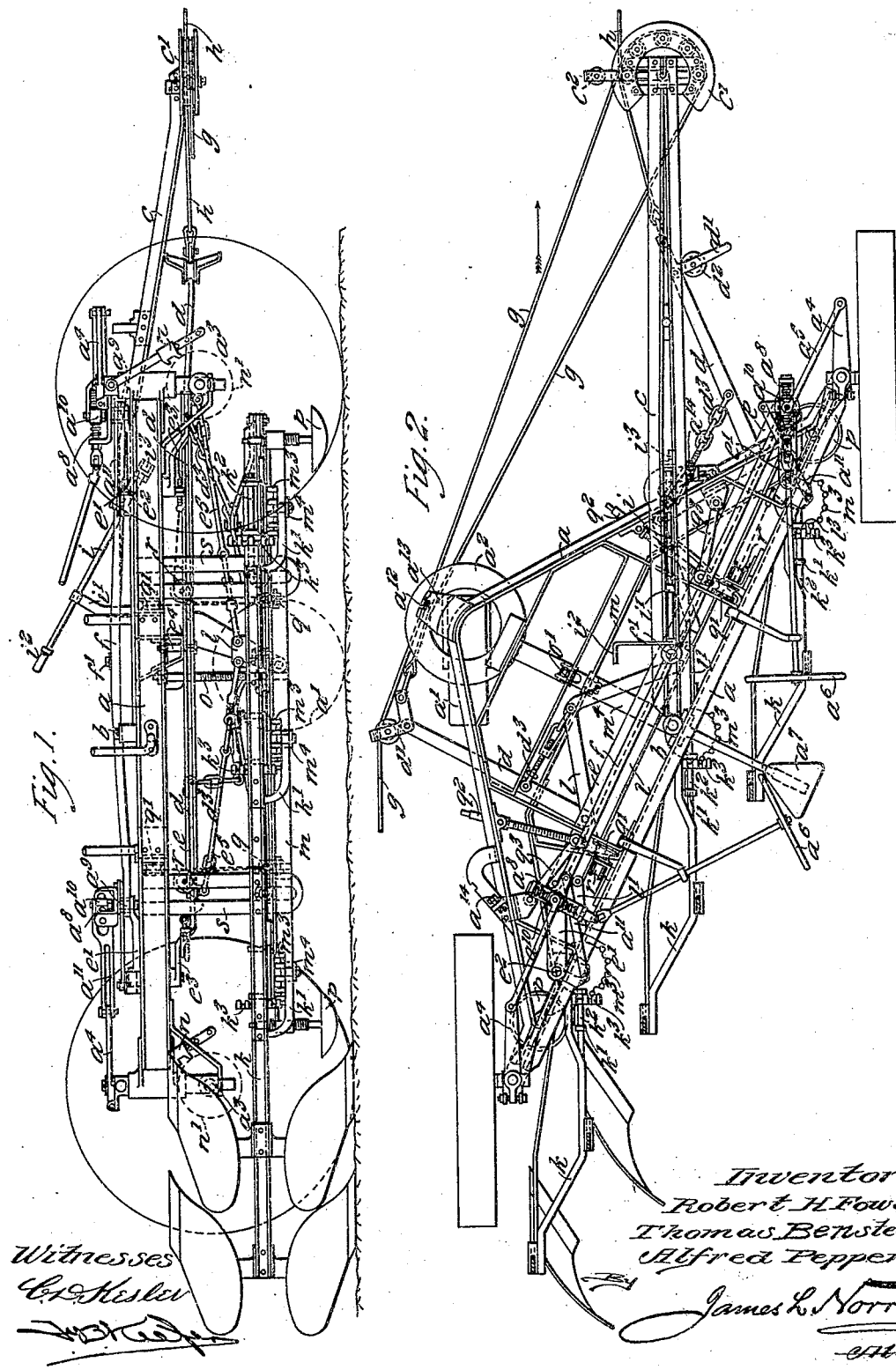

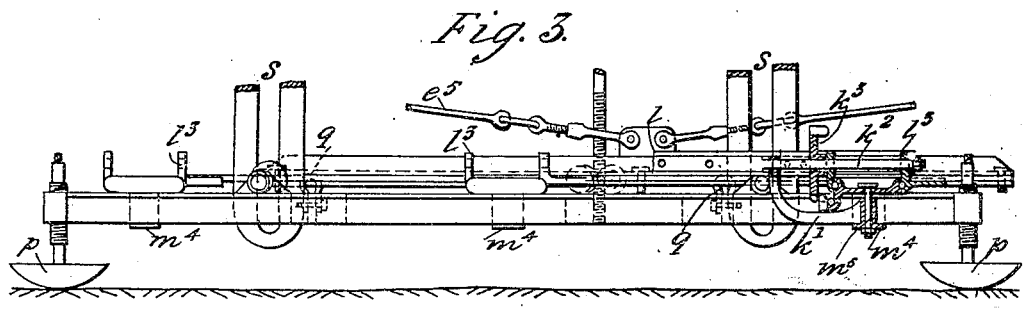
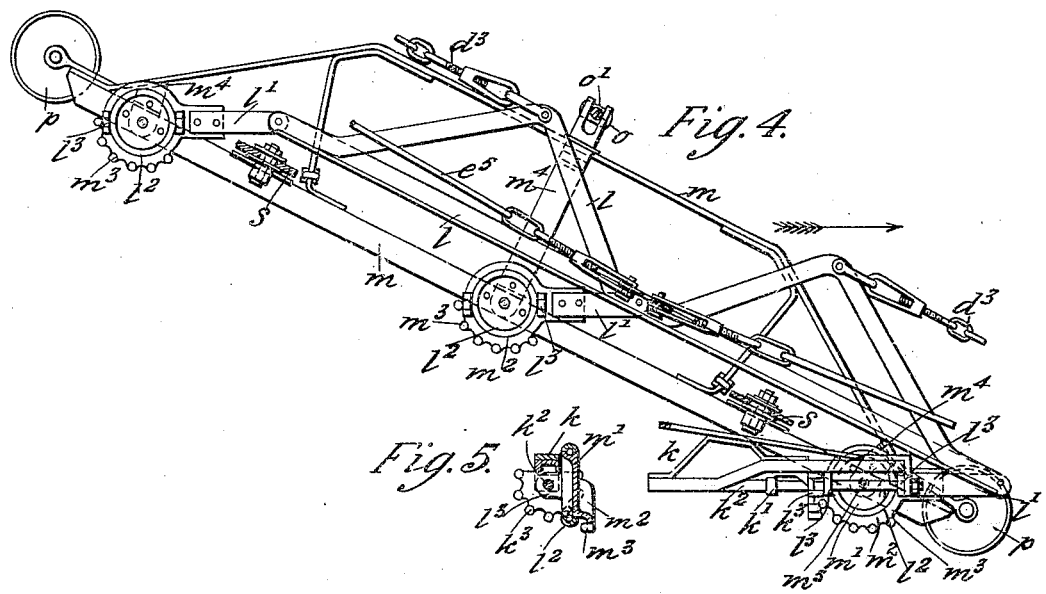

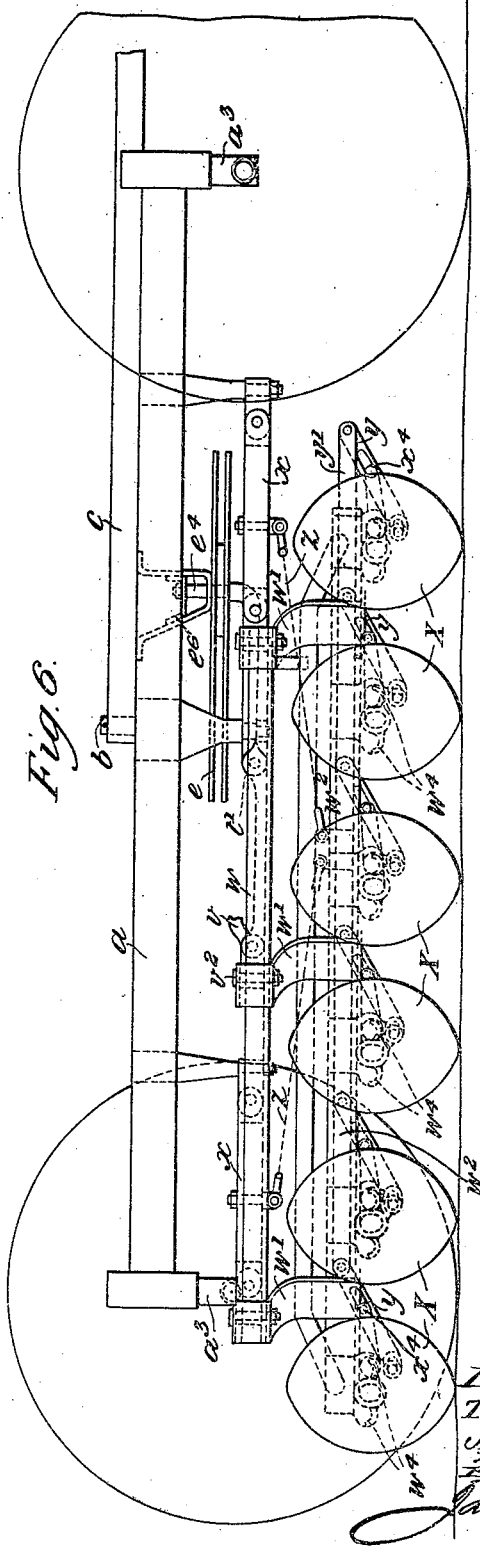

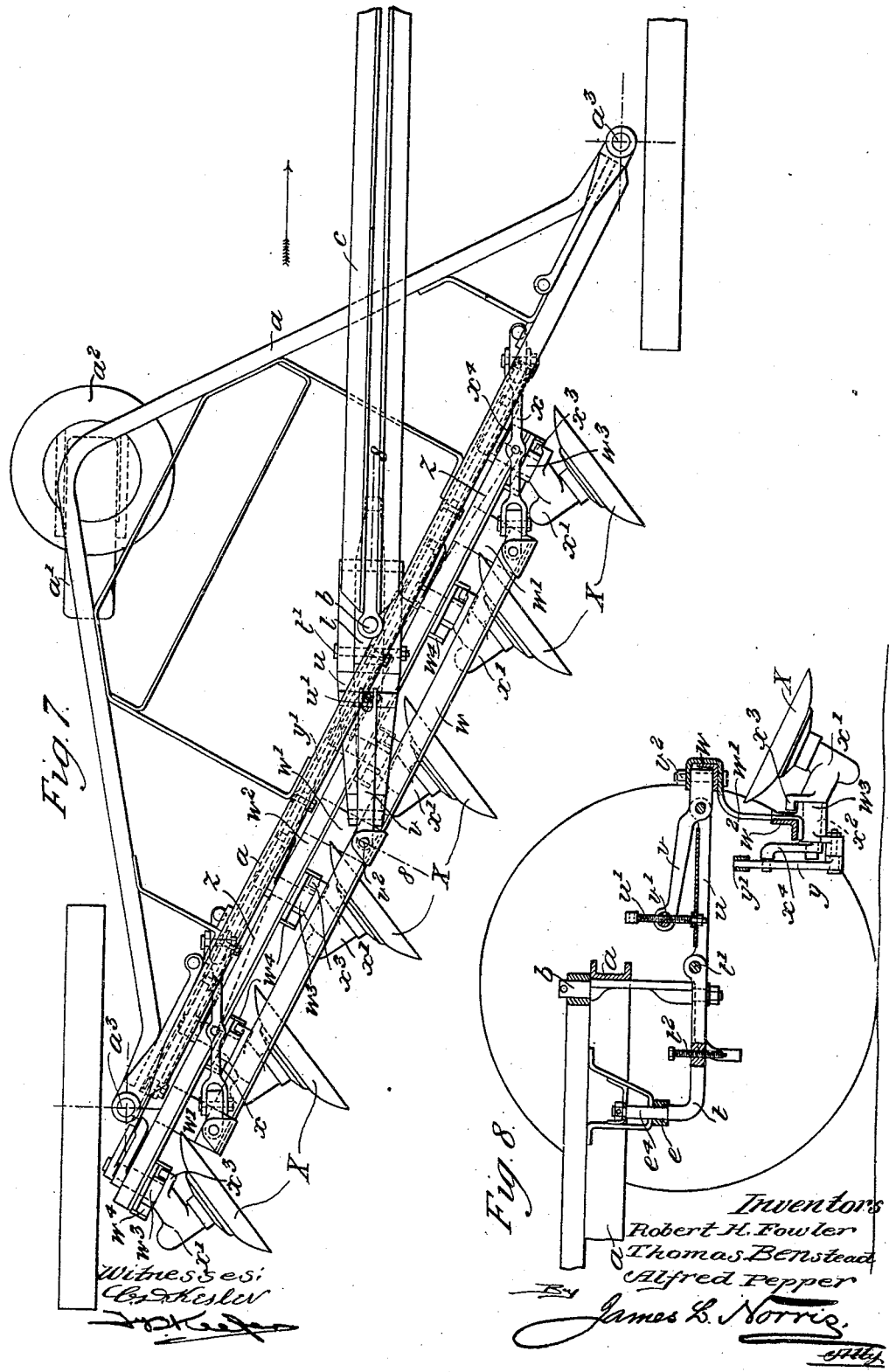

UNITED STATES PATENT OFFICE.

ROBERT HENRY FOWLER, THOMAS BENSTEAD, AND ALFRED PEPPER, OF LEEDS, ENGLAND.

DISK PLOW FOR STEAM CULTIVATION.

954,950.

Specification of Letters Patent. Patented Apr. 12, 1910.

Application filed January 4, 1909. Serial No. 470,667.

*To all whom it may concern:*

Be it known that we, ROBERT HENRY FOWLER, engineer, THOMAS BENSTEAD, draftsman, and ALFRED PEPPER, engineer, all subjects of the King of Great Britain, and all residing at Steam Plough and Locomotive Works, Leeds, in the county of York, England, have jointly invented a certain new and useful Improved Disk Plow for Steam Cultivation, of which the following is a specification.

In British patent specification No. 9299 of 1890 and U. S. Patent No. 463,502 is described a plow adapted for being drawn to and fro by traction ropes, or for being hauled by direct traction, for effecting plowing or like operations on the soil; the pull of the traction ropes or the direct pull of a tractor automatically controls the position of the shares or cultivating tools. Improvements in this type of plow were described in British specifications Nos. 12035 of 1893, 14584 of 1897 and 14325 of 1901 and in corresponding U. S. Patent Nos. 534216, 608514 and 714570.

The present invention relates to further improvements whereby the mechanism is simplified and the turning over of the shares or tools is accomplished with less friction and greater certainty; the tilling is better under control and the width and depth of plowing are more uniform.

The improvements according to the invention are mainly these:—The main frame is of triangular form in plan supported at three points, namely at the apex by a caster wheel and at each end of the base by a running wheel; the hauling ropes are attached to separate draft levers and are guided around the arm pivoted to the base of the triangle; this arm is connected with the steering mechanism of the running wheels to turn them on vertical axes, by a bar pivoted to the arm; the movement of this bar is communicated to a bar or frame in the underframe and by novel connections this bar or frame turns the shares or tools out of action and then into action in the reverse direction; at the same time the movement of the first named bar determines the change of position of the underframe relatively to the main frame to compensate for the fact that one wheel runs on land and the other in a furrow; or instead of this mode of determining the change of position, the underframe may be freely suspended from the main frame and the change of position determined by suitable adjustable skids.

The accompanying drawings illustrate the invention.

Figure 1 is a side elevation and Fig. 2 a plan of a share plow constructed according to the invention, in the position for plowing, except that for clearness the running wheels are shown on the same plane; some of the shares have been removed in both figures, and parts of the steering gear in Fig. 1. Fig. 3 is a side elevation partly in section, and Fig. 4 a plan of the underframe of Fig. 1 removed from the main frame and without the shares. Fig. 5 is a detail view. Fig. 6 is a side elevation and Fig. 7 a plan of the plow modified for disk plowing, in the position for plowing, with the reservation referred to in respect of Figs. 1 and 2, and Fig. 8 is a section on line 8—8 of Fig. 7, the parts being in the position they have when the plow is turning. Figs. 9 and 10 are an elevation and a plan respectively of the underframe of the disk plow showing an alternative method of attaching the supporting chains, the parts being shown in what is hereinafter described as the square position of the plow.

The main frame $a$ is of triangular shape in plan and carries at its apex a caster wheel $a'$, which in the form shown is mounted in a socket depending from a turn-table $a^2$ as described in British specification No. 14584 of 1897 in reference to Fig. 6 thereof and in the corresponding U. S. Patent No. 608514. At each end of the base of the triangle is a socket in which turns an L pin $a^3$, the horizontal limb of which constitutes the axle of the running wheel; to the vertical limb is fixed a lever $a^4$ connected by a link $a^5$ with a nut $a^{10}$ working on a screw spindle $a^8$ turned by the hand wheel $a^6$ to give to the wheels the small angular movements about a vertical axis required for steering the implement from the driver's seat $a^7$. Steering mechanism of this kind is described in British specification No. 12035 of 1893 and in the corresponding U. S. Patent No. 534216.

In brackets fixed to the center of the base of the triangle is carried a perch pin $b$ on which turns a horizontal arm $c$, to the other end whereof is fixed a quadrant $c'$ carrying a double sheave pulley for the usual hauling ropes $g$, $h$ which when the plow turns pass in opposite directions one around each sheave, the slack rope being guided on to the pulleys by arm $c^2$ pivoted at the center of the quadrant. The eye end of each rope is attached to a shackle on one arm of a bell crank lever $d'$ carrying on its other arm a guide pulley $d^2$ and centered on the end of an arm $d$ which is pivoted to a bar $e$ beneath the main frame and is attached by a chain $d^3$ with the jointed frame $l$ presently to be described.

Above the arm $c$ is a bar or link $f$ which at its middle is pivoted at $f'$ to the arm $c$ and serves to connect with the arm $c$ the spindles $a^8$ which are connected as aforesaid with the wheel axles. For this purpose each spindle is mounted in brackets carried by a vertical pin $a^9$ extending through an eye in the end of the link $f$, and the nut $a^{10}$ has an arm connected by link $a^{11}$ with the frame $a$. Furthermore the pin $a^9$ extends through an eye on an arm $e'$ keyed to a pin $e^2$ turning in brackets fixed to the main frame.

Owing to the combination so far described, when it is desired to turn the plow and tension is put upon the rope $g$ which has hitherto been the slack rope, the arm $c$ is turned on the perch pin and in so turning turns through the link $f$ the running wheels on vertical axes until they are in planes substantially at right angles to the base of the frame $a$; when this is the case the middle longitudinal line of the arm $c$ is substantially at right angles to the said base and the plow may be said to be in the square position. The arm is now locked in this position by a modification of the device described for a like purpose in British specification No. 12035 of 1893 and in the corresponding U. S. Patent No. 534,216. This consists of a spindle $i$ adapted to be turned in a bracket $i'$, mounted on the arm $c$, from the driver's seat by a crank $i^2$. The end of this spindle carries a semi-cylindrical socket $i^3$ adapted, when in one position, to engage, as the arm $c$ sweeps around, a pin $a^{12}$ on a bracket $a^{13}$ at the apex of the main frame, and, when turned through 90° from this position, to become disengaged from the said pin.

The movement of arm $c$ into the square position also turns the tool or share frames $k$, which carry in known manner two sets of shares or other implements, through an angle of 90° about an axis to bring the shares out of action. For this purpose each of the pins $e^2$ carries beneath the main frame an arm $e^3$ pivoted to the end of the bar $e$, which latter is pivoted at its middle by a pin $e^4$ to a bracket $e^6$ depending from the arm $c$. Thus bar $e$ shares the movement of link $f$ and drags with it a jointed frame $l$ (Fig. 4) with which it is connected by chains $e^5$. Frame $l$ lies above the underframe $m$ and is connected therewith by pivoted arms $l'$. To each of these is bolted a ring $l^2$ in the inner face of which is a semicircular groove forming with a like groove in the periphery of a circular plate $m'$, a ball bearing. Plate $m'$ has a depending quadrantal flange $m^2$ which is bent at right angles and carries a number of upwardly directed peg-teeth $m^3$; the plate is fastened by a bolt $m^5$ to the flange of the underframe and to a bracket $m^4$ carried by the underframe. An upwardly curved lever arm $k'$ is pivoted on the bolt $m^5$ and forms at its upturned end one bearing for the member $k^2$ of the frame $k$, the other bearings being lugs $l^3$ on the ring $l^2$. Keyed to the member $k^2$ is a peg-tooth quadrant $k^3$ so situated that it engages with the teeth on the flange $m^2$ (Fig. 5).

It will be seen that when frame $l$ follows bar $e$ as aforesaid, arms $l'$ are turned and frames $k$ sweep through a corresponding angle, as each moves, the quadrant $k^3$ is turned by engagement with teeth $m^3$ so that the frame turns through an angle of 90° around the axis of member $k^2$. In the square position of the plow, therefore, the frames $k$ are substantially at right angles to the frame of the plow and the shares are out of action. As the pull on rope $g$ continues, arm $c$ being locked to the main frame as already described, the plow begins to turn about the wheel which was the rear wheel as an axis in the known manner, pawl $n$ engaging with a toothed wheel $n'$ fixed to the running wheel for the purpose of preventing the latter from running backward; such a pawl is described in British specification No. 14584 of 1897 with reference to Fig. 3 thereof and in the corresponding U. S. Patent No. 608514, but that here shown is improved in that it has two teeth, whereby there is secured more latitude for travel and a greater certainty of engagement with the notches of the wheel.

When the plow has been turned the driver releases the socket $i^3$ by turning crank $i^2$ and the arm $c$ finishes its movement, being brought to rest by engaging with the adjustable stop $a^{14}$ on the frame $a$. During this movement the running wheels are again turned into the position in which they are at an angle to the base of the main frame, and the frames $k$ perform the rest of their movement into the position the reverse of that shown in Fig. 2, for plowing in the direction opposite to that of the arrow. At the same time the frames $k$ are turned through another angle of 90° so that the shares which in the last bout were out of work are now brought into work. These movements are merely a continuation of those already described.

Reverting to the underframe, this is free to slide in slotted brackets $s$ depending from the main frame and is provided with an adjustable suspension from the main frame in the shape of a screw $o$ and nut $o'$. This suspension, together with an adjustable mushroom shaped skid $p$ at each end of the underframe, which skid is free to turn in a horizontal plane, affords means for determining the depth of the cut of the shares and allows the shares to follow the undulations of the ground, and the underframe to assume that position relative to the main frame which is rendered necessary owing to the fact that the forward wheel is in the furrow while the rear wheel is on the land, there being sufficient play of the frame in brackets $s$ to allow of this. When, however, the land is very wet, soft or sticky, the skids may be dispensed with and the underframe suspended by chains attached to shackles $q$ on the frame and passing over pulleys $q'$ carried by the main frame, to spindles $q^2$ which screw through nuts pivoted to links $q^3$ connecting them with the main frame. By turning the spindles the height of the underframe is adjusted. The compensation in position due to the fact that the leading wheel runs in a furrow as aforesaid, is secured by chains connected with shackles $q$ on the underframe and passing over pulleys $r$ to adjustable eyes on the bar $e$. As will be seen from Fig. 1 owing to the position of bar $e$ this chain at the leading end of the plow is taut, thus lifting the underframe slightly at the part near the leading wheel.

Referring now to Figs. 6–8, the general construction of the main frame of the plow is the same as that already described, but the underframe and the mode of turning the disks is considerably modified. The turning of the wheels is effected through the bar $e$ as in Figs. 1 and 2. The pin $e^4$ (Fig. 8) is here the upwardly turned end of a lever $t$ which is pivoted on a downward extension of the perch pin $b$ and carries at its free end a horizontal bolt $t'$ on which a lever $u$ can be turned by adjusting screw $t^2$. At the end of lever $u$ a lever $v$ is mounted to turn on a horizontal pin to an extent determined by screw $u'$ mounted to turn in lever $u$ and in a nut $v'$ pivoted in the forked end of lever $v$. The other end of the last named lever is connected by a vertical pivot $v^2$ with the middle of bar $w$ of the under frame. Each end of this bar is pivoted by a vertical pin to a block itself pivoted by a horizontal pin in the forked end of an arm $x$ which is similarly connected at its other end with a pin depending from the main frame. Brackets $w'$ depending from the bar $w$ carry a bar $w^2$ to which are fixed at intervals bearings $w^3$ for the pivot $x^2$ of the socket $x'$ in which the plow disk X turns on its axis. To the pivot $x^2$ is keyed a crank $x^4$ which engages in a slot in a link $y$ pivoted at one end to a lug on the bearing $w^3$ and at the other end to a bar $y'$. This bar is connected by chains $z$ with the arms $x$. On each side of bearing $w^3$ is a stop $w^4$ with which a lug $x^3$ on the socket $x'$ engages to limit the movement of the socket. When now the arm $c$ turns into the square position, levers $t$ and $u$ move the bar $w$ away from the main frame, the bar being kept parallel with the base of the main frame by arms $x$. At the same time one of the chains $z$ pulls the bar $y'$ so that each of the cranks $x^4$ is turned through an angle of 90° into the position shown in Fig. 8, which is the square position of the plow. When the plow has turned in the manner already described and the arm $c$ completes its movement, the movement of bar $w$ is completed and the cranks $x^4$ move through a further 90°, thus reversing the disks for plowing in the opposite direction to that of the preceding bout. The system of adjustable levers $t$, $u$ and $v$ enables the depth of plowing to be adjusted, and in the square position the more the axis of pin $v^2$ is inclined toward the main frame by turning screw $u'$ the higher will be the forward end of bar $w$ in the plowing position. This secures the automatic change of relative inclination of the underframe required to compensate for the fact that the leading wheel runs in a furrow.

In the modification shown in Figs. 9 and 10 the chains $z$ pass around pulleys $z'$ carried by the bar $y'$ and are attached to the bearings of links $y$.

Having thus described the nature of our said invention and the best means we know of carrying the same into practical effect, we claim:—

1. In a plow of the character referred to wherein the pull of the traction means automatically controls the operative position of the tools, the combination of a main frame of triangular form in plan, a caster wheel at the apex of the frame and adapted to support the apex of the frame in any position, a running wheel at each end of the base, the said running wheels being so connected to the frame as to form alternately a pivot on which the plow turns when reversing, substantially as described.

2. A plow of the kind herein described, comprising a main frame of triangular form in plan, a caster wheel at the apex of the triangle, a running wheel at each end of the base of the triangle, a horizontal arm pivoted to the said base, a guide arm pivoted to the free end of the said horizontal arm, guide pulleys carried by the free end of the said horizontal arm, the said guide arm and pulleys being adapted to guide the hauling ropes, a bracket carried by said horizontal arm, a bar pivoted to the bracket, and arms pivoted to the said bar and adapted to be connected with the free ends of the said ropes.

3. A plow of the kind herein described, comprising a main frame of triangular form in plan, a caster wheel at the apex of the triangle, a running wheel at each end of the base of the triangle, a movable tool frame carried by the main frame, a horizontal arm pivoted to the said base and adapted to control the movement of the tool frame, a link pivoted at its center to the said arm, means for steering the plow, and a joint at each end of the said link connecting it with the said means for steering the plow.

4. A plow of the kind herein described, comprising a main frame of triangular form in plan, a caster wheel at the apex of the triangle, a running wheel at each end of the base of the triangle, a horizontal arm pivoted to the said base, a bracket carried by said horizontal arm, a bar pivoted to the bracket, a link pivoted at its center to the said arm, means for steering the plow, a joint at each end of the said link connecting it with the said means for steering the plow, an underframe supported by the said main frame, a jointed frame between the said main frame and underframe, and means for communicating movements of the said bar to the said jointed frame.

5. A plow of the kind herein described, comprising a main frame of triangular form in plan, a caster wheel at the apex of the triangle, a running wheel at each end of the base of the triangle, a horizontal arm pivoted to the said base, a bracket carried by said horizontal arm, a bar pivoted to the bracket, a link pivoted at its center to the said arm, means for steering the plow, a joint at each end of the said link connecting it with the said means for steering the plow, an underframe supported by the said main frame, a jointed frame between the said main frame and underframe, means for communicating movements of the said bar to the said jointed frame, plow shares, a frame carrying the said shares, bearings carried by the said jointed frame in which the said share frame is adapted to turn on a horizontal axis, a peg-tooth quadrant fixed to the said underframe and a like quadrant fixed to the said share frame, the two quadrants being adapted to gear with each other to turn the said share frame when the said jointed frame is moved.

6. A plow of the kind herein described comprising a main frame of triangular form in plan, a caster wheel at the apex of the triangle, an underframe, means for supporting this underframe freely from the main frame, and swiveled mushroom skids carried by the said underframe.

7. A reversible plow of the kind herein described comprising a main frame of triangular form in plan, a caster wheel at the apex of the triangle, a running wheel at each end of the base of the triangle, an underframe, means for supporting this underframe freely from the main frame, and means for automatically changing the position of the said underframe relatively to the main frame when the plow is reversed and that one of the said running wheels which was formerly the furrow wheel becomes the land wheel.

8. A plow of the kind herein described, comprising a main frame of triangular form in plan, a caster wheel at the apex of the triangle, a running wheel at each end of the base of the triangle, a horizontal arm pivoted to the said base, a link pivoted at its center to the said arm, means for steering the plow, a joint at each end of the said link connecting it with the said means for steering the plow, an underframe pivoted to the main frame and adapted to be turned when the said arm is turned, plow disks mounted in bearings themselves pivotally mounted on the said underframe and means for turning the said bearings on their pivots when the said underframe is turned.

9. A plow of the kind herein described comprising a main frame of triangular form in plan, a caster wheel at the apex of the triangle, a running wheel at each end of the base of the triangle, a horizontal arm pivoted to the said base, toothed wheels fixed to the staid running wheels respectively, lever arms pivoted to the said main frame, and pawls adapted to slide adjustably on the said lever arms and to engage the said toothed wheels.

In testimony whereof we have signed our names to this specification in the presence of two subscribing witnesses.

ROBERT HENRY FOWLER.
THOMAS BENSTEAD.
ALFRED PEPPER.

Witnesses:
JOHN BARRATT,
HENRY JAMES DAVID JONES.